Figure 1:
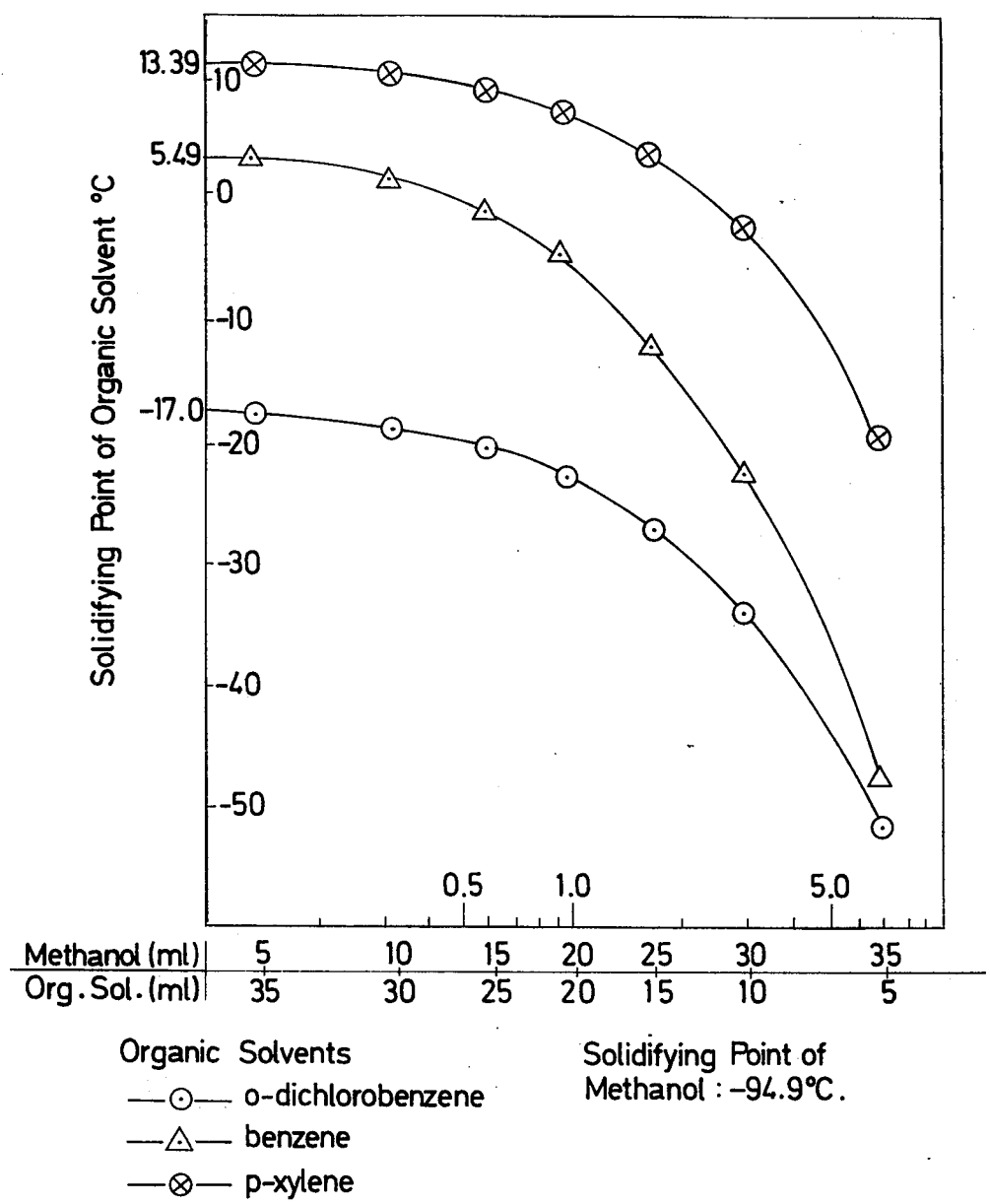

United States Patent [19]

Mizumoto et al.

[11] 4,031,039
[45] June 21, 1977

[54] METHOD FOR TREATING WASTE HIGH-POLYMER MIXTURE

[75] Inventors: Yoshiaki Mizumoto; Shigeo Hasegawa, both of Hiroshima, Japan

[73] Assignee: Mitsubishi Jukogyo Kabushiki Kaisha, Tokyo, Japan

[22] Filed: Aug. 23, 1976

[21] Appl. No.: 716,585

[30] Foreign Application Priority Data

Sept. 2, 1975  Japan .............. 50-105612

[52] U.S. Cl. .............. 260/2.3; 23/267 R; 23/271 P
[51] Int. Cl.² .............. B29H 19/00; C08J 11/04
[58] Field of Search .............. 23/267 R, 271 P; 260/2.3

[56] References Cited

UNITED STATES PATENTS

| | | | |
|---|---|---|---|
| 2,473,920 | 6/1949 | Taylor | 260/2.3 X |
| 2,522,069 | 9/1950 | Staten et al. | 260/2.3 |
| 2,692,820 | 10/1954 | Alway et al. | 23/267 R X |
| 3,296,240 | 1/1967 | MacDonald et al. | 23/271 P X |
| 3,392,158 | 7/1968 | Blair | 23/267 R X |
| 3,427,370 | 2/1969 | Schnell et al. | 260/2.3 X |
| 3,644,227 | 2/1972 | Factor | 260/2.3 |
| 3,666,691 | 5/1972 | Spiller | 260/2.3 |
| 3,696,058 | 10/1972 | Teti | 260/2.3 |
| 3,836,486 | 9/1974 | Hafner | 260/2.3 |
| 3,912,664 | 10/1975 | Wainer | 260/2.3 |

FOREIGN PATENTS OR APPLICATIONS

| | | | |
|---|---|---|---|
| 232,141 | 2/1959 | Australia | 260/2.3 |
| 617,788 | 4/1961 | Canada | 260/2.3 |

Primary Examiner—Murray Tillman
Assistant Examiner—T. DeBenedictis, Sr.

[57] ABSTRACT

A method for treating a waste high-polymer mixture by fractionating the mixture consisting essentially of five groups of high polymers, i.e., polyolefinic, polystyrenic, polyvinyl-chloride, thermosetting, and natural high polymers, taking advantage of their dissimilar solubilities in different organic solvents, characterized in that the mixture is brought into contact with o-xylene, p-xylene, or m-xylene, the solvents being used either singly or in a combination of two or more, at temperatures within a certain range or ranges to dissolve and fractionate the polystyrenic and polyolefinic high polymers, and the polyvinyl chlorides in the remainder are dissolved and fractionated by using at least one solvent selected from the group consisting of tetrahydrofuran, cyclohexanone, dioxane, and methylethylketone and at a temperature within a certain range, whereby the waste mixture is fractionated into the groups of polyolefinic, polystyrenic, polyvinyl-chloride, thermosetting, and natural high polymers.

7 Claims, 1 Drawing Figure

METHOD FOR TREATING WASTE HIGH-POLYMER MIXTURE

This invention relates to a method for fractionating a waste high-polymer mixture with organic solvents as main fractionation media and thereby recovering useful components. More particularly, the invention is concerned with a method of bringing a waste high-polymer mixture into contact with solvents, mostly of organic nature, and fractionating and purifying the mixture and effecting conversion to reusable high polymers of value by utilizing the different solubilities of the components in the solvents and at the temperatures used and also using their differences in solubility and separability in, and affinity for, the solvents of varied types.

From the standpoints of environmental protection and recycling of used materials, there is a great need for the development of techniques for treating wastes of high polymers which usually are mixtures of polyolefinic high polymers, such as polyethylenes and polypropylenes, polystyrenic high polymers, thermoplastic high polymers consisting mostly of polyvinyl chlorides, thermosetting high polymers mainly of phenol and epoxy types, and natural high polymers, such as paper, pulp, and cellophane.

A number of methods have been adopted or proposed for the treatment of waste high polymers. From the viewpoint of waste recycling, however, the wastes are too varied in composition and present such complex and knotty problems that there has been found no panacea.

For example, when thermal energy generated by the incineration of a waste is to be recovered or when the waste is to be gasified or liquefied by thermal decomposition, the properties of the resulting gas or the concomitant production of dust may make it necessary to take some step to prevent secondary pollution, for example, through the treatment of the waste water or gas. In addition, other problems such as shortened furnace life may arise.

It is known that waste high polymers may be melted with heat and then solidified to varied shapes for reuse. Actually, however, a waste high-polymer mixture treated in this way will give recovered products of un-uniform quality and therefore of little added value.

If the method described immediately above is to give satisfactory result, it is imperative that the waste mixture be fractionated into groups of high polymers, each group being composed of only the same kind of polymers where possible.

Also, in order that the conventional method be utilized with its defects corrected, any foreign matter that can obstruct the treatment process must be removed from the waste by fractionation. Recycling of waste high polymers is predicated on the establishment of a fractionation technique for selectively taking out from the waste the substances of added value that may be easily reused as recovered resources. Nevertheless, no technical progress has been made yet over the prior art methods that depend on the force of water, wind, or gravity as the fractionation media. It will thus be appreciated that the existing methods have limitations, particularly in the fractionation efficiency.

The present invention is directed to the elimination of the foregoing disadvantages of the prior art methods and to the provision of a novel method for treating a waste high-polymer mixture.

Usually, high-polymer articles are allowed to contain a plasticizer, stabilizer, filler and other auxiliary materials, or are blended or admixed with copolymers with rubber components, so as to attain improved processability and thermal, mechanical, electrical and other physical properties. For the same purposes they may be laminated or coated with, or impregnated in, paper, pulp, or cellophane. Thus a waste high polymer article constitutes a mixture of many different polymers.

Of a wide variety of high polymers, the thermoplastic resins, especially polyethylenes, polypropylenes, polystyrenes, and polyvinyl chlorides, and such high polymers of natural origins as paper and pulp which are in quantity production and hence wasted in large volumes, have been the subject of our experiments and studies for the development of a fractionation-recycling technique.

As a result, we found that a waste high-polymer mixture can be fractionated into separate groups of high polymers by using organic solvents, temperatures and other treating conditions carefully chosen to suit the composition, structure, and physical properties of the individual high polymers of the mixture. The concept was actually applied to the treatment of waste high-polymer mixtures, and it was experimentally confirmed that organic solvents so chosen have the both functions of fractionation and purification. Then, the present invention has been perfected.

The present invention has for its object to provide a method for treating a waste high-polymer mixture by fractionating the mixture consisting essentially of five groups of high polymers, i.e., polyolefinic, polystyrenic, polyvinylchloride, thermosetting, and natural high polymers, taking advantage of their dissimilar solubilities in different organic solvents, which comprises the steps of bringing the mixture into contact with o-xylene, p-xylene, or m-xylene, the isomers being used either singly or in a combination of two or more, at a temperature between 5° and 50° C to dissolve and fractionate the polystyrenic high polymers, and then at a temperature between 90° and 150° C to dissolve and fractionate the polyolefinic high polymers, such as polyethylenes and polypropylenes, and finally dissolving and fractionating the polyvinyl chlorides by heating the remainder by use of at least one solvent selected from the group consisting of tetrahydrofuran, cyclohexanone, dioxane, and methylethylketone, at a temperature between 5° and 60° C, whereby the waste mixture is fractionated into four groups of high polymers, i.e., polyolefinic, polystyrenic, polyvinyl-chloride, and thermo-setting and natural high polymers.

Also, in accordance with the invention, there is provided a method for treating a waste high-polymer mixture by fractionating the mixture consisting essentially of five groups of high polymers, i.e., polyolefinic, polystyrenic, polyvinyl-chloride, thermosetting, and natural high polymers, taking advantage of their dissimilar solubilities in different organic solvents, which comprises the steps of bringing the mixture into contact with o-xylene, p-xylene, or m-xylene, the isomers being used either singly or in a combination of two or more, at a temperature between 90° and 150° C to dissolve and fractionate the polyolefinic and polystyrenic high polymers, if necessary cooling and fractionating the mixture of polyolefinic and polystyrenic high polymers into the two groups by deposition, and then dissolving and fractionating the polyvinyl chlorides from the rest by use of tetrahydrofuran or cyclohexanone at a temperature between 5° and 60° C.

In experimentally carrying the method of the invention into practice, choice was made of the test high-polymer mixtures on the basis of actual data of waste generation. The high polymers chosen were synthetic resins, or thermoplastics including the four major types of plastics, i.e., polystyrenes, polyethylenes, polypropylenes, and polyvinyl chlorides, and thermosetting high polymers such as of phenol and epocy types, and natural high-molecular substances, such as pulp, paper, and garbage. Organic solvents for use in fractionation and purification were selected from a group of several tens after tests conducted in consideration of the polarity, crystallinity, noncrystallinity and other properties of the high polymers to be encountered. Other factors taken into consideration in choosing the solvents included their stable commercial availability, ease of handling, and cost. Although the suitable combination of organic solvents thus chosen varies with the types of high polymers to be treated, all of the solvents that can dissolve the high polymers and have phase separability between themselves and the polymers are useful.

More definite details of the invention will become apparent as the description proceeds with reference to the accompanying drawing, wherein:

FIG. 1 gives data experimentally obtained on mixing ratios and solidifying points of organic solvent-methanol mixtures.

For polystyrenic high polymers a wide variety of solvents including aromatic organic solvents may be used. Benzene, toluene, and xylene are preferred and, above all, xylene is more preferable because of its favorable action in the treatment for the fractionation of polyethylenes and polypropylenes to be described later.

For these polyolefinic high polymers the xylenic solvents are chosen on the grounds that the solvents can be used in the treatment at normal pressure, they can dissolve polyolefins at ordinary pressure and at temperatures from 90° to 150° C, and they have a tendency of reducing their solubilities and causing polyolefin precipitation upon cooling of the high polymer solutions. The xylenic solvents, or o-, m-, and p-xylenes, may be used either singly or in a combination of two or more such isomers.

For polyvinyl chlorides, tetrahydrofuran and cyclohexane that can dissolve them at ordinary temperature and dioxane and methylethylketone that can dissolve them at about 80° C are desirable solvents.

The aforesaid organic solvents may be used in dissolving, selectively taking out, and purifying synthetic high polymers from, for example, plastic laminates, such as polyethylene-paper, polyethylene-metal, and mixed paper of synthetic and natural pulps, plastic-impregnated articles, and plastic-inorganic, plastic-fiber, and various other mixtures and composite articles. The thermoplastic high polymers having two-dimensional structures are readily dissolved and fractionated by those organic solvents, whereas the thermosetting polymers having three-dimensional structures remain insoluble and not fractionatable.

The solvents cannot dissolve pulp, paper, proteins, garbage, and other natural high-molecular substances, but can dissolve synthetic high polymers. The use of such organic solvents permits further expansion of the scope of applications for the invention.

In the fractionating treatment according to the invention, an organic solvent may be mixed with some other solvent for deposition use to achieve improvements in the fractionation efficiency and in the purity of the fractionated and recovered substances. For example, when a mixed solvent of the BTX-water type (BTX standing for a mixture of benzene, toluene, and xylene) is used, polyolefinic and polystyrenic high polymers are dissolved and led into the BTX solvent phase, while hydrophilic high polymers having the -OH groups or the like, or water-soluble substances, such as natural pulp and polyvinyl alcohols, migrate to the aqueous phase, thus making fractionation possible. Also, if an organic solvent is mixed with an alcohol, the former will have dissolving and extracting actions and the latter a depositing action, making it easy to separate the high polymers from the organic solvent.

Diversified tests have indicated that useful solvents for depositing the dissolved high polymers are water and alcohols, the latter being preferred. The term "alcohols" as herein used means the alcohols having the general formula $C_nH_{2n+1}OH$ wherein $n$ is an integer from 1 to 4, namely, methyl, ethyl, n-propyl, isopropyl, n-butyl, isobutyl, secondary butyl, and tertiary butyl alcohols.

In treating high-polymer mixtures for dissolutive extraction and deposition, the solvents of two different types for those purposes are chosen and combined in the manner described, each type being represented by one or more, preferably one solvent, in the light of the dissolutive extractibility of desired polymers and the cooling and heating conditions to be used.

After the use for dissolution and deposition, the solvent mixture may be cooled by liquefied natural gas or other known refrigerant to a low temperature range between the ordinary level and $-161°$ C so that the deposition solvent is solidified and separated from the rest of the mixture.

Actually, as already stated, the waste mixtures of high polymers to be treated contain many different organic and inorganic substnces added in the form of plasticizers, stabilizers, fillers, pigments and other so-called auxiliary materials. Moreover, they may contain decomposed organic matters and other contaminants. In the process of dissolutive fractionation in accordance with the invention, the auxiliary materials and contaminants are mostly dissolved and transferred into the organic solvents, water and the like away from the high-polymer mixture or are separated and removed from the latter by filtration, precipitation, or other physical means. Some of the auxiliary materials and contaminants difficult to separate and therefore left behind can be effectively removed by the organic solvents with the addition of a substance of substances having chemical affinities for the solvents, e.g., inorganic acids and inorganic alkali salts, such as HCl, $H_2SO_4$, NaOH, and $NaSO_3$, and their solutions, organic acid compounds, such as acetic acid, citric acid, organic sulfonic acids, and organic carboxylic acids, or organic basic compounds, such as organic amines. In this way the recovered high polymers can be purified. For example, a $CdS-BaSO_4$ pigment may be brought into contact with a xylene-HCl mixture at from 10° to 150° C to decompose the same chemically into $CdCl_2$ and $H_2S$, or alternatively the pigment may be treated with a xylene-surface active agent mixture for separation by selective adsorption.

In accordance with the present method using organic solvents as main media, as described above, polyolefinic and polystyrenic high polymers and paper and pulp of particular additional values are fractionated from waste mixtures. After the fractionation the remainders include polyvinyl chlorides and other high polymers, unfractionated thermosetting polymers, and adherent or putrid organic matters. These residues are thermally decomposed at from 250° to 500° C so that acidic compounds such as HCl and fuel in gaseous or liquid form can be recovered. The recovered HCl and other acidic compounds are placed in contact with high polymers present in the organic solvents, whereby the substances having chemical affinities for the acidic compounds are carried into the aqueous solution of HCl, with consequent purification of the high polymers. On the other hand, the recovered fuel in gaseous or liquid form can be utilized as the source of steam or heat necessary for the dissolutive fractionation and solvent removal in accordance with the invention.

The high polymers fractionated, purified, and recovered by the method of the invention must be improved in physical properties to be regenerated products to suit intended uses. Since the high polymers in the process of dissolution or deposition are dissolved, deposited, or suspended in organic solvents, it is convenient to add property-improvers, such as inorganic fillers, fibrous materials, antioxidants, ultraviolet ray-intersepting agent, and processability-improving agents, directly to the high polymers. The additives can be evenly dispersed and mixed in the high polymers, and the solvents are then removed therefrom. The products in the form of pellets or formed articles thus obtained with the addition of property-improvers have uniform quality, good processability, and filler dispersibility.

As described hereinbefore, the present invention permits fractionation of waste high polymers in the form of a composite mixture into reusable high-polymer materials, by use of organic solvents as essential fractionation media. As a technique derivable from this fractionation method, it is possible to combine the step of dissolutive fractionation according to the invention with a step of fueling, steam generation or heat recovery, whereby desired high polymers are selectively recovered by extraction while the other polymers are incinerated or thermally decomposed for generation of steam or recovery of heat in other ways. Moreover, the fact that the high polymers in the course of dissolutive fractionation take the form of a liquid, slurry, or powder may be taken advantage of in utilizing the recovered polymers as component materials with advantageous properties, such as binders, fillers or the like, or themselves as composite materials. It is further possible to improve the quality of the recovered products by adding various auxiliary materials to suit the end uses.

Embodiments of the present invention will be described hereunder.

EXAMPLE 1

A waste high-molecular mixture was prepared as a sample by thoroughly mixing a waste thermoplastic material comprising 20 g of fragments of about 10–50 mm in size obtained from a polystyrene one-way container for fermented milk products, 20 g of foamed polystyrene used as a cushion for packing, 20 g of fragments of about 10 – 40 mm in size from a polyethylene one-way container for milk products and 20 g of fragments of about 10 – 20 mm in size from a polypropylene container, with 10 g of fragments of about 10 mm in size from a thermosetting high polymer mixture comprising epoxy resins and phenol resins and 10 g of paper pieces of a natural high molecular substance.

100 g of the above mixed sample and 0.5 l of industrial mixed xylene were placed in a separable glass flask having a content volume of 2 l equipped with a water cooled condenser, stirrer and thermometer, and heated from the outside in an oil bath.

Only polystyrene in the above sample was easily dissolved after a 15-minute treatment at normal temperature of 22° C. The resulting polystyrene-xylene solution was separated through filtration. The insoluble matters remaining after separation of polystyrene were further washed with 0.1 l of xylene at normmal temperature, while the filtrate polystyrene solution was dessolvented to recover C in form of powder.

The insoluble matters after washing were admixed with 0.5 l of xylene and treated at temperatures of 125° – 130° C for 40 – 50 minutes, resulting in dissolution of polyethylene and in xylene. Then, the insoluble matters were separated from polyethylene and polypropylene in the state of a xylene solution through filtration. The polyethylene and polypropylene dissolved in the xylene solvent of the separation liquid were allowed to deposit therefrom by cooling and recoveredd as a mixture thereof in powder form after dessolventing. The remaining matter containing polyvinyl chloride and thermosetting high molecular substances which had been undissolved in xylene through the treatment at normal temperature and even 130° C, was treated by dissolving first polyvinyl chloride at normal temperature for 40 minutes with a tetrahydrofuran solution capable of dissolving it, and then dessolventing the dissolved polyvinyl chloride so that polyvinyl chloride was recovered in the form of powders.

As shown in the above experiment, a mixed waste solid comprising the four main groups consisting of polyolefinic high polymers including polystyrene, and polyethylene-polypropylene, polyvinyl chloride high polymer, thermosetting high polymer, and paper can be fractionated by using two organic solvents, xylene and tetrahydrofuran, as the fractionation media. The fractionation efficiency was high (95% or more) for every fractionally recovered substances.

EXAMPLE 2

Experiment was carried out with the same equipments and mixed waste solid sample as in Example 1. To 100 g of the mixed sample, 1 l of xylene was added, and heated for 50 minutes at about 180° C to dissolve polystyrene, polyethylene, and polypropylene which were separated through filtration fron insoluble polyvinyl chloride, thermosetting high polymer and paper. These xylene-insoluble matters were washed with 0.2 l of xylene at 120° C. Meanwhile the xylene solution containing polystyrene, polyethylene and polypropylene dissolved therein was cooled gradually, down to the room temperature of about 20° C, to deposit a mixture of polyethylene and polypropylene, which was separated through filtration from polystyrene dissolved in xylene. Both the recovered polyethylene-polypropylene mixture and polystyrene were obtained in the form of powders after dessolventing. On the other hand, polyvinyl chloride and thermosetting high polymer substances and paper remaining insoluble even after treatment with xylene at 130° C were treated with tetrahydrofuran at normal temperature for 40 minutes to dissolve only polyvinyl chloride, and then it was separated through filtration. It was proved through the experiment that the use of xylene and tetrahydrofuran as the fractionation media enables to fractionate a mixed waste high molecular material into three groups of polystyrene-polyethylene-polypropylene mixture, polyvinyl chloride-thermosetting high molecular substances and paper, or into four groups of polystyrene, polyethylene-polypropylene mixture, polyvinyl chloride, and thermosetting high molecular substances.

EXAMPLE 3

200 ml high density milk bottles having a weight of about 10 g per bottle which were used as a one-way container, each was divided into two pieces, and washed previously with p-xylene at normal temperture to remove printing ink, water, and other concomitants. To a dissolution tank equipped with a condenser and stirrer, 100 ml of p-xylene was placed, heated to 120° C and then the milk bottles were dissolved by two of the halves with stirring.

A resulting solution containing polyethylene at a concentration of 5% by weight had 0.4 to 0.5 poises apparent viscosity, in which the dissolution of one bottle required a period of about 5 minutes. On the other hand, a solution containing 15% by weight of polyethylene had about 100 poises apparent viscosity, in which the dissolution of one bottle required about 14 minutes. Considering deposition of polyethylene during cooling in an after-treatment process, polyethylene could be dissolved up to a concentration of about 25% by weight. When cooled to 70° – 80° C, polyethylene polymer dissolved at 120° C in p-xylene began to be deposited in powder form, and was completely separated from the p-xylene solvent when cooled to a normal temperature of 15° – 20° C.

After cooling, a slurry containing polyethylene powders was filtered by squeezing, to separate polyethylene powders from p-xylene. The polyethylene powders obtained by the squeezing filtration under reduced pressure had p-xylene two to three times weight of polyethylene itself. After sqeezing filtration, p-xylene remaining in polyethylene powders was removed by heating under reduced pressure, or dehydration and drying after steam stripping.

The milk bottle in this example was made of polyethylene having 0.94 g/cm$^3$ of density, 0.53 of MI (g.10 min.) and 3.2 × 10$^4$ of number average molecular weight. On the other hand, polyethylene recovered in the experiment described above had 0.94 – 0.95 g/cm$^3$ of density, 0.4 – 0.7 of MI (g/10 min.) and 3.7 – 3.9 × 10$^4$ of number average molecular weight, and contained 6 – 24 ppm of remaining p-xylene, in average of 7 samples, which was almost in agreement with that before treatment, in respect of characteristics such as density, dissolubility and molecular weight distribution pattern.

As for polypropylene, a foamed product was experimented. Polypropylene could be recovered by treating the foamed product at a dissolution temperature of 130° – 132° C, with p-xylene, in the same operations as the case of polyethylene.

EXAMPLE 4

Paper laminates have also been used often as one-way containers for milk products, coffee, tea and the likes. Tetrapack-paper for milk product containers is of processed paper obtained by laminating a polyethylene film onto natural pulp paper, which possesses characteristics of both constituents, for example printability, water-resistance, and toughness. Waste tetrapack-paper or the like still containing pulp component was beaten for the recovery and re-utilization of pulp. The residue comprising chrifly polyethylene film still contained a remaining amount of pulp.

In this example, waste processed paper which had been much depulped by a pulp heater was used as samples, although the method of the invention can be directly applied to the waste processed paper not treated by beating.

The sample was dried for several hours at about 80° C, and 30 g of the sample was used in the experiment, which comprised 6 g of pulp, 17 g of high density polyethylene having 0.958 – 0.959 of specific gravity, and water of the balance.

The sample (30 g) was added into 400 ml of industrial xylene in a reactor equipped with a condenser, and then heated and dissolved under stirring at 100° – 130° C for 30 minutes. Pulp was dispensed in the liquid with a tendency of aggregation, while polyethylene was dissolved in xylene. Pulp was filtered with a 0.6 – 0.7 mm wire screen at about 110° – 120° C, and then squeezed by hand to release the remaining xylene as much as possible. Thus obtained, xylene-containing pulp weighed 22 g. After treating said pulp at a temperature of 90° C under a reduced pressure of 50 mm Hg. for 10 hours to further remove xylene, the weight thereof was 6 g. By utilization of squeezing filtration, the xylene content in pulp could be reduced considerably.

On the other hand, another sample was treated with xylene at 120° C for 30 minutes. The pulp content obtained from this sample was dessolvented by steam stripping for 4 hours and further dehydrated to dry at 90° C under a reduced pressure of 50 mm Hg for 8 hours while another pulp content was merely dessolvented at 90° C under a reduced pressure of 50 mm Hg for 8 hours to remove xylene. From the variation in weight of both of the pulp contents, it was confirmed that the amount of polyethylene remaining in pulp was very low.

It is possible in industry to re-cycle and re-use the xylene solvent by directly removing xylene remaining in the pulp with superheated vapor, and taking the solvent and steam with a condenser, while drying of pulp. Polyethylene dissolved in xylene from which pulp had been filtered began to be deposited, when cooled from a temperature of about 70° – 80° C, and deposited completely when cooled to a temperature of about 20° C. It was filtered under a reduced pressure through a Buchner funnel by a vacuum pump. The xylene filtrate had a volume of about 20 ml, and colored in a yellowish green ascribed to the dissolution of printing ink. Evaporation of xylene left a 0.2% by weight of residue. Polyethylene powders separated by filtration weighed 68 g, which was decreased to 17g after xylene-removal at a drying temperature of 90° C for 10 hours. Recovered polyethylene was slightly colored in a yellowish green which was probably ascribed to the dissolution of printing ink. This color was easily eliminated by washing with fresh xylene.

EXAMPLE 5

50 g of Disused packing polystyrene formed through the expandable bead process were added in 200 g p-xylene, and dissolved with stirring at 20° – 25° C for 10 minutes. Impurities insoluble in p-xylene were removed by filtering with filter paper No. 5A.

Then, 150 ml of the filtrate, a p-xylene solution of polystyrene, were added to 450 ml methanol with full stirring, so that polystyrene was separated by deposition as white powders. The filtrate after deposition and separation of polystyrene was of a binary mixed solvent comprising p-xylene and methanol.

The filtrate was cooled to −2.5° – −5.0° C to solidify and deposit p-xylene, which was separated from methanol. In this procedure, polystyrene could be recovered in a yield of about 100% as a powdery starting material.

EXAMPLE 6

A cup made of an impact-resistant polystyrene often used as a one-way container was subjected to the same treatment as Example 5. Polystryrene homopolymer could be recovered excepting graft polymers.

EXAMPLE 7

A polyvinyl chloride sheet with a thickness of 8 mm was shaved with a drill, pulverized to 0.5 – 2 mm grain sizes in the coexistance of dry ice, and then passed through a sieve. The powdery sample (40 g) was added into 300 ml of o-dichlorobenzene, and allowed to be dissolved and deposited by stirring at 40° – 50° C for about 40 minutes. The treated liquid was separated through filtration, and then 200 ml of the resulting filtrate were dropped into 600 ml of methanol with full stirring. After deposition, polyvinyl chloride was separated through filtration. The filtrate from which polyvinyl chloride had been separated by deposition was of a mixed solvent of o-dichlorobenzene/methanol. It was further cooled to −34° – −35° C, to separate o-dichlorobenzene from methanol.

EXAMPLE 8

A double-spread polyethylene corrugated card board with a thickness of 4 mm was cut in a size of about 20 × 20 mm, which was used as the sample. 30 g of the sample were dipped in 300 ml of o-dichlorobenzene, and heat-dissolved by stirring at 80° – 85° C in a round bottom flask equipped with a condenser for 60 minutes. The treated liquid was filtered at 80° – 85° C with a heat jacket filter, to separate auxiliary matters such as insoluble fillers coexisting with the corrugated cardboard. When the filtrate was gradually cooled to room temperature by leaving as it was, a part of polyethylene began to precipitate with formation of gel. But, 200 ml of this filtrate were added to 500 ml of methanol with the complete deposition of polyethylene white powders, which was separated and recovered.

The mixed solvent comprising o-dichlorobenzene and methanol used for dissolutive extraction and deposition was cooled to −33° – 34° C, whereby o-dichlorobenzene crystals were deposited and methanol was also recovered in the form of solution. Thus, both of the recovered o-dichlorobenzene and methanol were reusable.

EXAMPLE 9

Polypropylenic composite paper was cut in sizes of about 20 × 20 mm, which was used as samples. 10 g of the sample were dipped in 100 ml of o-dichlorobenzene, and then treated, in an operation similar to that of Example 8, by heating at 130° C for 60 minutes to dissolve and extract polypropylene. Insoluble rubber components and calcium type fillers coexisting in paper were separated through filtration. 50 ml of the resulting filtrate were cooled to a temperature near room temperature, and added into 120 ml of methanol under stirring, with the deposition and separation of polypropylene powders. The filtrate from which polypropylene had been separated was subjected to the same manner as Experiment 8 utilizing cold at −30° – −34° C so that both of the above solvents were separated through solidification.

EXAMPLE 10

Each pellet of commercially available polystyrene, polyvinyl chloride, polyethylene and polypropylene was fractured in the coexistence of dry ice by a mill, and sieved to grain sizes of 0.5 – 2.0 mm. 10 g of each of these four kinds of powders were mixed to prepare a mixed sample. 200 ml of p-xylene were than added into said mixed sample, and contracted therewith at 25° – 27° C for 30 – 40 minutes under stirring so that only polystyrene could be selectively dissolved and extracted.

The sample from which polystyrene had been dissolved and extracted was filtered with a 60 mesh screen, and 300 ml of the crude filtrate were added into 900 ml of methanol under stirring to deposit and separate polystyrene as white powders almost completely. Into about 30 g of the filtration residue containing polyvinyl chloride, polyethylene and polypropylene as undissolved components, 300 ml of o-dichlorobenzene were then added, and stirred at 40° C for 40 – 50 minutes enough to dissolve and extract only polyvinyl chloride. This sample was filtered by use of a 60 mesh screen at 30° – 50° C and 250 ml of the obtained filtrate were added into 750 ml of methanol enough stirred, whereby polyvinyl chloride could be deposited and separated as white powders.

Furthermore, undissolved polyethylene and polypropylene were added into 300 ml of o-dichlorobenzene and stirred at about 80° C for 60 minutes to dissolve and extract only polyethylene. After this treatment, the sample was filtered with a 60 mesh screen at 70° – 90° C, and 200 ml of the filtrate were added into 600 ml of methanol under stirring thereby to deposit and separate polyethylene as white powders.

The residual polypropylene as the undissolved component was treated in the same way as polyethylene. In this case, temperatures required for dissolution were 120° – 140° C.

As for the p-xylene-methanol mixed solvent and o-dichlorobenzene-methanol mixed solvent produced in each of the above operations, each of p-xylene and o-dichlorobenzene was deposited as a solid separated from methanol, by cooling the former mixed solvent at −2.5° – −5.0° C and the latter at −34° – −±° C, respectively. They could be again utilized.

In Graph 1, there are shown the practical data of the mixing ratios and solidifying points in the organic solvent (o-dichlorobenzene, benzene and p-xylene)-methanol mixed systems. For cooling each of the above mixed solvents, the data were used so that each of p-xylene and o-dichlorobenzene was separated by utilization of the differences in their solidifying point due to cooling.

On summarizing the above Examples 5, 6, 7, 8, 9, and 10, the present invention will comprise, in combination, the following features:

a. the polymers are first dissolved and fractionated at a temperature falling within the range from normal temperature to 150° C by utilizing a solvent for dissolution and extraction and the differences in temperature, b. the polymers dissolved in the solvent are deposited and separated in form of powders by using a solvent for deposition, and c. the solvent for deposition in the mixed solvent is solidified and separated by utilizing a low temperature zone from normal temperature to −161° C caused by a coolant such as liquefied natural gas, liquefied petroleum gas or like, which is added to the solvents used for dissolution and extraction and for deposition.

EXAMPLE 11

A container for transporting beer, juice etc., made of polypropylene containing 0.6% of a CdS—ZnS—$BaSO_4$ type yellow pigment was fractured into sizes of about 5 cm. The container fragments were dissolved at 120° − 130° C by use of industrial xylene as a solvent for dissolution, and then cooled so as to be deposited as a yellowish polymer slurry. Then, xylene contained in the polymer slurry was removed by squeezing filtration as much as possible. Into a 500 ml volume Erlenmeyer flask having stirring function with a magnetic stirrer, there were placed 10 g of the swollen, powdery polypropylene sample containing about 70% of xylene. 50 cc of hydrochloric acid having a concentration of 20% were poured thereinto at room temperature and this pouring was regulated by a stirring motor so that hydrochloric acid was uniformly applied to the polymer. Hydrogen sulfide produced as a gas was collected through a method according to the Japanese Industrial Standards K 0108-Volumetric Method, in which the variation in the cource of time of hydrogen sulfide produced into 100 ml under the reduced pressure of 90 mm Hg by an aspirator was sought. For the first 30 minutes after the commencement of the reaction, the amount of produced hydrogen sulfide reached 73.6% of the total production amount and after one hour from the commencement 94% thereof. On and after one hour and a half from the commencement, production of hydrogen sulfide was not observed. The yellowish polymer was decolored as the amount of hydrogen sulfite produced was increased. The polymer became quite white after one hour and a half from the commencement so that polypropylene changed in color to its inherent one could be recovered.

The polymer from which the contained, heavy metal salts had been transferred as $CdCl_2$ and $ZnCl_2$ into a hydrochloric acid solution through the above treatment was filtered and separated and then washed with warm water of 50° C several times. The recovered, dry material was tested through the low temperature incineration method to determine the amount of Cd remaining in the recovered polymer. For the polymer left after one hour of the reaction time, as a result, it was found that the remaining Cd amount was 90%, but for one left after one hour and a half or more of the reaction time, the presence of the contained Cd was little observed.

In this example, the quantitative mass balances of Cd, Zn and S in the polymer, in the hydrochloric acid solution and in the produced hydrogen sulfide were well proportioned with one another, and the amounts of deposited CdS and ZnS which had been obtained by combining, at the pH value of 9, a liquor of NaOH containing the produced hydrogen sulfide absorbed therein and a solution of $CdCl_2$ and $ZnCl_2$ produced by the above hydrochloric acid treatment, were almost agreed with the amounts of them present in the container.

EXAMPLE 12

The same sample as Example 11 was experimented through the same method as Example 11 by use of 20% hydrochloric acid added with 0.5% of a surface active agent of polyethylene oxide nonylphenol ether. As a result, the elution velocities of Cd and Zn were increased by 10% as compared with those of a case using 20% hydrochloric acid and it was required one hour and 40 minutes for the completion of the reaction.

EXAMPLE 13

The same experiment for the same sample as the Example 11 was carried out by use of 10% hydrochloric acid. As a result, the reaction velocity was found to be lower by about 60% than that of a case using 20% hydrochloric acid and this reaction was completed after two hours and 20 minutes from the commencement.

EXAMPLE 14

To a container for transporting juice or likes, made of polypropylene added with 0.5% of a CdS—ZnS—$BaSO_4$ type yellow pigment and containing a matrix resin of ethylene-propylene copolymer, the same pretreatment as the Example 11 was applied and the experiment was carried out under the same condition. As a result of using hydrochloric acid having a concentration of 20%, the amount of produced hydrogen sulfide reached 58% of the total production amount for the first 30 minutes after the commencement of the reaction and 78% after one hour from the commencement. Hydrogen sulfide was not produced at all after two hour and 10 minutes. At the completion time of the reaction when almost 100% of Cd and Zn in the container had been extracted as $CdCl_2$ and $ZnCl_2$ into the hydrochloric acid solution, the polymer powders were changed in color from yellow to white.

EXAMPLE 15

There were mixed 20 g of fragments of about 5 − 50 mm in size from a polystyrene one-way container for fermented dairy products, 20 g of foamed polystyrene for packing, 20 g of fragments of about 5 −40 mm in size from a polyethylene one-way container for milk, 20 g of fragments of about 5 − 20 mm in size from a polypropylene container colored with CdS, ZnS and $BaSO_4$ dispersed therein, 5 g of epoxy resin fragments of 2 mm in thickness and 5 g of phenol resin fragments of 5 − 10 mm in thickness, to prepare a mixed, high molecular material sample.

500 ml of industrial xylene were placed in a three neck separable flask having a content volume of 2 l equipped with a thermometer, a stirrer and a liquid inlet port, and set at 120° − 130° C in an oil bath. Then, the above mixed sample was charged thereinto, and stirred at 100 rpm for one hour to dissolve polystyrene, polyethylene and polypropylene high molecular substances. Insoluble high molecular substances were separated by means of a wire screen and the solution was cooled to room temperature to separate polyethylene and polypropylene therefrom. By use of a Buchner funnel, polystyrene was then fractionated from a mixture of polypropylene and polyethylene.

The high molecular substances fractionated in the above operation were placed into a reduced pressure drier and dissolvented at 60° C to recover xylene. The amount of recovered xylene was 480 ml, and there were recovered 19 g of polystyrene, 38 g of the mixture of polyethylene and polypropylene, 29.5 g of a mixture of polyvinyl chloride and the thermosetting high molecular substances.

EXAMPLE 16

A ceramic boat on which all the amounts of polyvinyl chloride and the thermosetting high molecular substances fractionated in the Example 15 had been put, was placed at the center of a silica reaction tube of 50 mm diameter and 500 mm length. Then, air in the interior thereof was replaced with nitrogen and the reaction tube was heated by an electric furnace so that its temperature was raised to 300°–350° C. Under such a condition, said high molecular substances were thermally decomposed for one hour. Produced hydrogen chloride was collected at room temperature into three 300 ml absorption glass bottles with 200 ml of water contained therein which were connected, by use of nitrogen gas as a carrier gas. The recovered hydrogen chloride was 6% to the above sample.

EXAMPLE 17

15g of the residue of the Example 16 were thermally decomposed at 450°–500° C for 1 hour by use of the same apparatus as Example 16. The thermally decomposed components were collected into a cooling collector using liquid nitrogen, by use of nitrogen gas as a carrier. The recovered, thermal decomposition products were 70%.

EXAMPLE 18

Into a three neck flask having a content volume of 300 ml equipped with a thermometer, a liquid feeder and a cooler, 5 g of the mixed powders of polypropylene and polyethylene recovered in Example 1 and 50 ml of xylene were placed. The resulting mixture was heated at 120°–130° C in an oil bath while being stirred by a magnetic stirrer to dissolve said powders.

Then, according to the method of JIS 0108, such a measurement was taken that the produced hydrogen sulfide can be collected. After preparing the hydrochloric acid solution recovered in Example 16 to a concentration of 5%, 20 ml of the prepared solution were measured and taken into the liquid feeder and dropped into the flask through its cock opened. After 30 minutes from the dropping of the hydrochloric acid solution, the polymer colored with a CdS—ZnS—BaSO$_4$ type pigment was changed in color to white. After 30 minutes, 60 minutes and 90 minutes from the commencement of the reaction, the amount of hydrogen sulfide produced reached 96%, 98.5%, 100% of the total production amount. Just after 90 minutes, the production of hydrogen sulfide was not observed. After the reaction had been completed, the flask was cooled to room temperature to deposit the polymers. The amounts of Cd and Zn in the filtrate obtained by filtering and washing the deposited polymers were determined by the atomic spectrometric method and the result thereof was well in accord with the amount of hydrogen sulfide collected and analyzed.

The recovered polymer was completely white, in which the existence of Cd and Zn could be ignored.

EXAMPLE 19

100 g of a waste solid of a laminated film composed of cellophane and polyethylene fractured in size of less than 50 mm and 1 l of industrial xylene were placed in a separable flask having a content volume of 2 l equipped with a thermometer, a cooler and a stirrer. Under stirring by the stirrer, they were heated to 120°–130° C in an oil bath thereby to dissolve polyethylene. Then, the dissolved material and undissolved material were separated by use of a wire screen, and cellophane remaining on the wire screen was dissolvented by a vacuum drier. The other solution was cooled to room temperature to phase separate xylene and polyethylene completely. The separated polyethylene was filtered under reduced pressure by a Buchner funnel and the dissolvented by a vacuum drier. The amounts of cellophane and polyethylene recovered each was 40 g and 60 g. Cellophane could not be detected in the recovered polyethylene.

EXAMPLE 20

Into the same apparatus as Example 11, 100 g of a waste solid of a laminate composed of polyethylene terephthalate and polyethylene and 1 l of industrial xylene were placed and heated to 120°–130° C to dissolve polyethylene. Then, the dissolved material and undissolved material were separated by use of a wire screen. Polyethylene terephthalate remaining on the wire screen was dissolvented by vacuum drying and then weighed. On the other hand, polyethylene in the solution was recovered through the same operation as Example 1. The amounts of polyethylene terephthalate and polyethylene recovered each was 67 g and 33 g.

EXAMPLE 21

The same apparatus and operation as Example 19 were applied to 100 g of a waste solid of a laminate composed of cellophane, polyethylene, aluminium foil and polyethylene. After polyethylene had been dissolved and recovered, cellophane and aluminium foil were separated by use of a vibrating screen of 8 mm sequare wire mesh.

The amounts of cellophane, polyethylene and aluminium foil recovered each was 18 g, 54 g and 28 g, but 10% of cellophane was contained in the recovered aluminium.

EXAMPLE 22

100 g of a waste solid of a laminate composed of nylon 6 and polyethylene were treated by the same apparatus and operation as Example 19 to dissolve polyethylene. Thus, nylon 6 and polyethylene were fractionated.

The amounts of nylon 6 and polyethylene recovered each was 39 g and 70 g.

EXAMPLE 23

200 g of a mixed, waste solid of a laminate composed of cellophane, aluminium foil, polypropylene, polyethylene, ethylene-vinyl acetate copolymer, nylon, polyethylene terephthalate and polycarbonate were treated by use of the same apparatus as Example 19. At first, polycarbonate and ethylene-vinyl acetate copolymer were dissolved and separated therefrom by xylene of normal temperature, and polyethylene and polypropylene by xylene of 120° – 130° C. Polyethylene terephthalate was dissolved and separated therefrom by phenol of 80° C and then cellophane and aluminium were separated by a vibrating screen.

The amounts of the recovered high molecular substances were as follows: 79.1 g of cellophane, 42.1 g of aluminium containing 30% of cellophane, 50.2 g of a polypropylene-polyethylene mixture, 12.2 g of a mixture of ethylene-vinyl acetate copolymer and polycarbonate, 2.8 g of nylon and 8.6 g of polyethylene terephthalate.

For the dessolventing of the polypropylene-polyethylene mixture, nylon and polyethylene terephthalate after dissolution, each of them was phase separated by cooling to room temperature, filtered and then dried by a vacuum drier.

EXAMPLE 24

High density polyethylene having a density of 0.94 g/cm$^3$ and a melt index (g/10 min.) of 0.53 was dissolved at 120° C under enough stirred condition by use of p-xylene as a solvent, to prepare a 10% solution of polyethylene. The apparent viscosity of this solution at 120° C was approximately 10 poise.

Calcium sulfite having an average grain size of 5 $\mu$ was added as a filler into the 10 wt.% solution of polyethylene at the ratios of 1/3, 1, 1 1/2 and 3 per the weight of polyethylene contained therein, and sodium salt of stearic acid was further added as a surface activity improver at the ratio of 1% by weight into the filler-contained polyethylene solution, and well mixed and dispersed.

As the filler-homogeneously dispersed polyethylene solution kept at 120° C was gradually cooled under a medium speed stirring state, the filler was coprecipitated as powders while being incorporated in polyethylene of the homogeneous layer. This sedimentation was completed near at room temperature of 20° C. Powders produced by squeeze filtering the sediment under reduced pressure were dissolvented enough by vapor distillation and then dried by reduced pressure dehydration at 100° C.

This product was quite different from a mixture obtained merely by mechanically mixing polyethylene powders and calcium sulfite. It was qualitatively identified from the dispersibility and separability of polyethylene powders that they were in a condition incorporating or covering calcium sulfite.

The processability of the product was further investigated. Relative comparisons in accordance with the Brabender Plastograph carried out for relations between the solidifying time and the kneading torque, resin temperature, time cource and filler content at the numbers of rotation of a rotor of 50 rpm and 80 rpm. With respect to the kneading torque, the product showed values 5 – 15% lower as compared with the mechanically mixed one.

EXAMPLE 25

Medium type high impact polystyrene consisting of 70 parts (by weight) of polystyrene for wide application and 80 parts (by weight) of impact-resistant polystyrene was dissolved at 45° C under stirring by use of cyclohexane as a solvent, to prepare a 35 wt/% solution. Calcium sulfite was added into the solution at the ratios of 2/3 and 1 per the weight of polystyrene contained therein. The resulting solution was cooled to 15° C in accordance with Example 1 so that the phase separation occurred with forming the upper layer of cyclohexane and the lower layer of a cyclohexane-calcium sulfite slurry. After the filtering separation and dissolventing of the slurry, powders were obtained. Similarly as the result of Example 1, it was observed by an electron microscope that polystyrene covered the surface of the calcium sulfite filler and the relatively improved processability of the polystyrene powders was found.

EXAMPLE 26

Plate-prismatic particles of calcium sulfide having grain sizes of 20 – 50 $\mu$ recovered from an exhaust gas desulfurization plant were dried for about 10 hours by a hot blast drier set at 180° – 200° C, and then pulverized by a hammer type pulverizer. As a result of the observation by an electron microscope, it was found that calcium sulfide was easily pulverized to amorphous fine particles of less than 10 $\mu$ in grain size.

EXAMPLE 27

Particles essentially containing calcium sulfide having tabular crystal form recovered from an exhaust gas desulfurization plant were dried as well as Example 26, and then pulverized. The resulting particles were amorphous which contained a large number of particles of less than 1 $\mu$.

EXAMPLE 28

By means of a Sigma model kneader, 30 parts of calcium sulfide filler obtained by the treatment of Example 26 were mixed with 80 parts of polyethylene pellets having a melt index (MI) of 0.4 and 40 parts of polyethylene powders having MI of 0.3, at room temperature for 10 minutes, and then a sheet of 0.5 mm in thickness was manufactured from the resulting mixture through the T die method using a single screw extruder with a cylinder of 50 $\phi$ inner diameter. The dispersibiltiy of the manufactured sheet was very high. From the observation by a scanning type electron microscope, the secondary aggregation of calcium sulfide filler in polyethylene was not found at all.

EXAMPLE 29

With 30 parts of polyethylene pellets MI of 0.4 and 40 parts of polyethylene powders MI of 0.3, 80 parts of calcium sulfite filler obtained through the treatment of Example 27 were mixed and a sheet was manufactured in the same way as Example 28. The thus-obtained sheet possessed very high dispersibility.

EXAMPLE 30

30 parts of plate-prismatic calcium sulfide particles of 20 – 50 $\mu$ recovered from an exhaust gas desulfurization plant, 30 parts of polyethylene having MI of 0.4 and 40 parts of polyethylene having MI of 0.8 were mixed at room temperature by a Sigma model kneader. From the resulting mixture, a sheet was manufactured by the same apparatus as Example 28. In the whole surface of the obtained sheet, however, secondarily aggregated particles as large as 2 – 3 mm were produced. The circumference of large aggregated particles did not get to fit the resin, with holes formed, Thus, it was known that manufacturing of sheet was impossible when desorption of water of crystallization from calcium sulfide and pulverizing treatment into amorphous particles were not effected.

EXAMPLE 31

Manufacturing of a sheet from the starting material of Example 30 in which 1 – 3% of calcium stearate was added as a lubricant, was tried, but large secondarily aggregated particles were produced. Thus, manufacturing of sheet was difficult in spite of improvements in wetting of calcium sulfide particles onto polyethylene and prevention of calcium sulfide particles from aggregating mutually.

EXAMPLE 32

By using tabular, thin pieces of calcium sulfite having an average grain size of 2 – 3 $\mu$, manufacturing of sheet was tried as well as Example 30. As a result, secondarily aggregated particles of 2 – 3 mm were produced on the whole surface of the sheet with showing very low dispersibility.

EXAMPLE 33

30 parts of calcium sulfide filler obtained by the treatment of Example 26 were added into 30 parts of polyethylene pellets and 40 parts of polypropylene powders, and from the resulting mixture, a sheet was manufactured through the same operation as Example 28. The dispersibility of the obtained sheet was very high.

EXAMPLE 34

By the same operation as Example 28, a sheet was manufactured from 20 parts of polyethylene pellets, 30 parts of polyethylene powders and 50 parts of the calcium sulfide filler obtained through the treatment of Example 26. The dispersibility of the obtained sheet was very high.

EXAMPLE 35

Into a 2 l, three neck separable flask equipped with a cooler, a stirrer and a thermometer, 50 g of fragments of a waste one-way container made of polystyrene were placed and 200 ml of xylene were added thereto. The fragments were dissolved under stirring and then 500 g of hemihydrate gypsum were added. After the resulting mixture had been stirred and mixed so as to be homogeneously dispersed, it was dissolvented by a reduced pressure drier and then fractured simply so that a powdery mixture of polystyrene and hemihydrate gypsum was obtained. The powdery mixture was added with water and the water-mixed ratio of 45 and kneaded, and then poured into a 100 × 100 × 40 mm polyvinyl chloride mold. After hardening, the molding was cured in a hot blast drier set at 40° C for 2 days to obtain a gypsum hardened article containing polystyrene dispersed therein. This hardened article was impregnated with xylene and then immersed into a xylene solution of 20% of a waste polystyrene one-way container and thereafter dissolvented, thereby to obtain a gypsum hardened article filled and covered with polystyrene. It was found from the current water test that the reduction in weight of this article was 0.2% for 15 days with negligible variation after that.

EXAMPLE 36

Mixed powders were prepared from 10 g of fragments of a waste one-way container, 200 ml of xylene and 500 g of hemihydrate gypsum by the same apparatus and method as the Example 35. A gypsum hardened article filled and covered with polystyrene, which was obtained by the same way as Example 35, was tested about its water-resisting quality, and, as a result, the reduction in weight thereof was found to be 0.5 % for 15 days.

EXAMPLE 37

By using only the same hemihydrate gypsum as one used in Example 35 and Example 36, a polystyrene-gypsum mixture with water added therein was prepared. The water-resisting quality of a gypsum hardened article obtained by molding and curing said mixture was tested. It was found that the reduction in weight thereof for 7 days reached 60% with losing its original form.

EXAMPLE 38

By use of the same apparatus as Example 35 fragments of waste solids containing 10 g of polyethylene, 10 g of polyvinyl chloride and 10 g of polystyrene were mixed and added with 200 ml of xylene. The resulting mixture was heated to 120° – 130° C under stirring in an oil bath to dissolve polyethylene and polystyrene, and then the fragments of undissolved polyvinyl chloride were separated by a wire screen. The solution was cooled to room temperature to form the separated phase of polyethylene. Polyethylene crystals were separated by a Buchner funnel and then a solution of polystyrene was obtained. This polystyrene solution was placed in the same flask as Example 35 and 500 g of hemihydrate gypsum were added thereinto. In the same way as Example 35, the polypropylene-gypsum mixture was then treated to obtain a gypsum hardened article filled and covered with polystryene. The water-resisting quality of this hardened article was tested and such a result was found that the reduction in weight thereof was 0.3% for 15 days.

EXAMPLE 39

Through the same apparatus and method as Example 35, 250 g of hemihydrate gypsum and 250 g of Portland cement were added into 200 ml of xylene in which 20 g of polystyrene fragments had been dissolved, to obtain a powdery mixture of polystryene, hemihydrate gypsum and cement. The hardened article obtained by treating the powdery mixture in the same way as Example 35 was tested about its water-resisting quality. Thus, it was found that the reduction in weight thereof was 0.2 % for 15 days.

What is claimed is:

1. A method for treating a waste high-polymer mixture by fractionating the mixture consisting essentially of five groups of high polymers, comprising polyolefinic, polystyrenic, polyvinyl-chloride, thermosetting, and natural high polymers, taking advantage of their dissimilar solubilities in different organic solvents, which comprises bringing the mixture into contact with o-xylene, p-xylene, or m-xylene, the isomers being used either singly or in a combination of two or more, at a temperature between 5° and 50° C to dissolve and fractionate the polystyrenic high polymers, and then at a temperature between 90° and 150° C to dissolve and fractionate the polyolefinic high polymers, and finally dissolving and fractionating the polyvinyl chlorides by heating the remainder in at least one solvent selected from the group consisting of tetrahydrofuran, cyclohexanone, dioxane, and methylethylketone, at a temperature between 5° and 60° C, whereby said waste mixture is fractionated into four groups of high polymers, comprising polyolefinic, polystyrenic, polyvinychloride, and a mixture of thermosetting and natural high polymers.

2. A method for treating a waste high-polymer mixture by fractionating the mixture consisting essentially of five groups of high polymers, comprising polyolefinic, polystyrenic, polyvinyl-chloride, thermosetting, and natural high polymers, taking advantage of their dissimilar solubilities in different organic solvents, which comprises bringing the mixture into contact with o-xylene, p-xylene, or m-xylene, the isomers being used either singly or in a combination of two or more, at a temperature between 90° and 150° C to dissolve and fractionate the polyolefinic and polystyrenic high polymers, if necessary cooling and fractionating the mixture of polyolefinic and polystyrenic high polymers into the two groups by deposition, and then dissolving and fractionating the polyvinyl chlorides from the rest by use of tetrahydrofuran or cyclohexanone at a temperature between 5° and 60° C.

3. A method according to claim 1, wherein each said organic solvent contains water, an alcohol $C_nH_{2n+1}OH$ (wherein $n = 1, 2, 3$ or $4$), inorganic acid, organic acid, inorganic alkaline compound, or organic basic compound, either singly or in a combination of two or more.

4. A method for treating a waste high-polymer mixture which comprises bringing the mixture consisting essentially of five groups of high polymers, comprising polyolefinic, polystyrenic, polyvinyl-chloride, thermosetting, and natural high polymers, into contact with a mixture of an organic solvent and water to separate the same into two groups comprising (A) a mixed group of polyolefinic, polystyrenic, polyvinyl-chloride, and (B) thermosetting and natural high polymers, drying said natural high polymers by removing the residual organic solvent and water therefrom, and then treating the mixed group of high polymers in accordance with the method set forth in claim 1.

5. A method according to claim 2 wherein each said organic solvent containing a waste high-polymer mixture is placed in contact with water or an alcohol $C_2H_{2n+1}OH$ (wherein $n = 1, 2, 3$ or $4$) to deposit, separate, and recover the high polymers, and the mixture of the organic solvent and water or alcohol is solidified and separated at low temperatures, and then both of the separated solvents are recycled to the system.

6. A method according to claim 2, which comprises bringing a waste high-polymer mixture containing substances insoluble in the organic solvent used into liquid-to-liquid contact with the organic solvent containing an inorganic acid, organic acid, inorganic alkaline compound, or organic basic compound, either singly or in a combination of two or more, at a temperature between 10° and 150° C, thereby causing chemical reactions of said substances, and then separating and removing said substances to purify said high polymers.

7. A method for treating a waste high-polymer mixture which comprises, in combination, the five steps of: bringing the mixture consisting essentially of four groups of high polymers, comprising polyolefinic, polystyrenic, polyvinyl chloride, and thermosetting high polymers, into contact with an organic solvent, thereby dissolving and fractionating said mixture into three groups comprising polyolefinic, polystyrenic, and mixed polyvinyl chloride-thermosetting high polymers; removing the solvent from the fractions and recycling the recovered solvent for use in fractionating said waste high-polymer mixture; thermally decomposing said mixture of polyvinyl-chloride and thermosetting high polymers at from 250° to 350° C to recover hydrochloric acid and then at from 400° to 500° C to recover a gaseous or liquid fuel; bringing the fractionated polyolefinic high polymers into contact with the hydrochloric acid obtained by said thermal decomposition and removing the substances soluble in the hydrochloric acid, thereby purifying said polyolefinic high polymers; and burning the high polymers freed of hydrochloric acid or said gaseous or liquid fuel to recover heat or generate steam, and then supplying the recovered heat or generated steam as the source of heat to each of said treatment steps.

* * * * *